(12) United States Patent
Kim (10) Patent No.: US 7,228,150 B1
(45) Date of Patent: Jun. 5, 2007

(54) CAMERA MOUNTED TWO-WAY WIRELESS PERSONAL VIDEO/AUDIO COMMUNICATION SYSTEM

(75) Inventor: Hyung-Tae Kim, Incheon (KR)

(73) Assignee: Woo Ju Communication Co., Ltd., Incheon (KR)

( * ) Notice: Subject to any disclaimer, the term of this patent is extended or adjusted under 35 U.S.C. 154(b) by 0 days.

(21) Appl. No.: 09/481,652

(22) Filed: Jan. 12, 2000

(30) Foreign Application Priority Data

Jan. 12, 1999 (KR) ............................. 1999-634

(51) Int. Cl.
*H04B 1/38* (2006.01)
*H04N 7/14* (2006.01)

(52) U.S. Cl. .................. 455/556; 455/566; 455/66; 348/14.02; 348/14.05; 348/14.11; 348/211.2

(58) Field of Classification Search ................ 455/566, 455/556, 66, 550, 575, 90, 557; 348/14.01, 348/14.02, 14.03, 14.04, 14.05, 14.06, 14.07, 348/14.11, 14.14, 14.16, 211, 212, 213, 231, 348/232, 375, 143, 211.99, 211.1, 211.2, 348/211.4, 211.5, 211.6, 231.99, 231.3, 376
See application file for complete search history.

(56) References Cited

U.S. PATENT DOCUMENTS 5,491,507 A * 2/1996 Umezawa et al. ....... 348/14.02
6,335,753 B1 * 1/2002 McDonald ............... 348/14.01
6,535,239 B1 * 3/2003 Kim ......................... 348/14.02

FOREIGN PATENT DOCUMENTS

WO         96/38762    * 12/1996
WO         97/26744    *  7/1997

* cited by examiner

*Primary Examiner*—William Trost
*Assistant Examiner*—Rafael Perez-Gutierrez
(74) *Attorney, Agent, or Firm*—Lee & Hong (57) ABSTRACT

A two-way wireless personal video/audio communication system comprises a video mode switch for selecting a desired one of X, N, and R modes, and a video signal control circuit for transferring a video signal from a camera circuit to a display circuit in the N mode, a video signal from a remote terminal to the display circuit in the R mode and the video signal from the camera circuit to the display circuit and a video transmission/reception circuit in the X mode. The display circuit applies an output video signal from the video signal control circuit to a display to reproduce an image picked up by a camera. The camera circuit converts an image incident on a camera lens into an electrical video signal and outputs the electrical video signal to the video signal control circuit. The video transmission/reception circuit modulates an amplified video signal from the video signal control circuit into a radio frequency signal at a selected channel frequency, transmits the modulated radio frequency signal to the remote terminal through the antenna, receives a radio frequency signal from the remote terminal through the antenna at the selected channel frequency, demodulates the received radio frequency signal into a video signal, amplifies the demodulated video signal, and transfers the amplified video signal to the video signal control circuit.

19 Claims, 5 Drawing Sheets

CAMERA MOUNTED TWO-WAY WIRELESS PERSONAL VIDEO/AUDIO COMMUNICATION SYSTEM

CROSS REFERENCE TO RELATED ART

This application claims the benefit of Korean Patent Application No. 1999-634, filed on Jan. 12, 2000, which is hereby incorporated by reference.

BACKGROUND OF THE INVENTION

1. Field of the Invention

The present invention relates to a wireless communication system, and more particularly, to a two-way wireless portable video/audio communication system for transmitting and receiving video and audio signals.

2. Discussion of the Related Art

In conventional communication fields, such as a wireless two-way radio communication system, video transmission and wireless video transmission, there have been provided a variety of devices capable of transmitting and receiving audio and video signals by wireless means or by wire. These video communication devices may be of such a desktop type or cabinet type that they are designed with no restriction in device size and operating power, but they are not suitable for a portable device.

On the other hand, according to the rapid development of computer communication techniques, a wireless portable video communication device capable of overcoming restrictions in space and time has been required by enterprises or persons in various industrial fields.

SUMMARY OF THE INVENTION

Accordingly, the present invention is directed to a two-way wireless portable video/audio communication system that substantially obviates one or more of the problems due to limitations and disadvantages of the related art.

An object of the present invention is to provide a two-way wireless portable video/audio communication system wherein a portable terminal is used in a hand-held manner and includes a video input camera and a video output display.

Another object of the present invention is to provide a plurality of personal or remote terminals constituting one communication group operating at the same frequency as that of a main portable video communication unit or video communication station.

Another object of the present invention is to provide a video communication system wherein a portable terminal includes transmission on/off switches for video and audio signals so that it can be driven in a battery power saving manner.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a portable wireless communication system having a microphone, a speaker, and a transmission/reception antenna, comprises a main communication system having a local camera disposed in a housing for the communication system; a video mode switch for selecting one of a first, second, and third modes; a camera circuit for converting an image incident on the local camera into a video signal; a display circuit for displaying images; a video signal control circuit for transferring the video signal from the camera circuit to the display circuit in the first mode, transferring the video signal, received through the antenna, from a remote terminal to the display circuit in the second mode, and transferring the video signal from the camera circuit to the display circuit and transmitting through the antenna in the third mode; a channel selection switch for selecting a frequency for transmission/reception of the video signal; a transmission/reception circuit for modulating an amplified video signal from the video signal control circuit into a radio frequency signal at the frequency selected by the channel selection switch and transmitting the modulated radio frequency signal to the remote terminal through the antenna; and a transmission on/off control circuit for controlling the transmission/reception circuit in response to the video signal control circuit.

According to one aspect of the present invention, the camera circuit stores a still frame image in a video memory and outputs the stored still frame image to the video signal control circuit when a still image switch is enabled, and outputs a moving image detected by the camera to the video signal control circuit when the still image switch is disabled.

According to another aspect of the present invention, the transmission/reception circuit receives a radio frequency signal from the remote terminal through the antenna at the frequency selected by the channel selection switch, demodulates the received radio frequency signal into the video signal, amplifies the demodulated video signal, and transfers the amplified video signal to the video signal control circuit.

According to another aspect of the present invention, the portable wireless communication system further comprises an audio signal control circuit for transferring an audio signal from the microphone to the transmission/reception circuit and for outputting an audio transmission on command signal to the transmission on/off control circuit when an audio transmission switch is enabled, and transferring an audio signal from the transmission/reception circuit to the speaker when the audio transmission switch is disabled.

The transmission/reception circuit modulates an audio signal from the audio signal control circuit into a radio frequency signal at the frequency selected by the channel selection switch, and transmits the modulated radio frequency signal to the remote terminal through the antenna.

According to another aspect of the present invention, the remote terminal comprises a remote camera disposed in a housing; a camera circuit for converting an image incident on the remote camera into a video signal; a video signal control circuit for transferring the video signal from the camera circuit to the display circuit and transmitting through the antenna; a transmission circuit for modulating an amplified video signal into a radio frequency signal and transmitting the modulated radio frequency signal to the main communication system through the antenna; a channel selection switch connected to the transmission circuit for selecting a frequency for transmission of the video signal; and a transmission on/off control circuit for controlling the transmission/reception circuit in response to the video signal control circuit.

According to another aspect of the present invention, the housing has first and second portions, wherein the local camera is in the first portion which is rotatably connected to the second portion.

According to another embodiment of the present invention, in a personal wireless communication system which is driven with battery power and includes an audio input microphone, an audio output speaker, a transmission/reception antenna, and audio transmission/reception circuitry, there is provided a two-way wireless personal video/audio communication system comprising a video mode switch for selecting a desired one of X, N, and R modes; a video signal control circuit for transferring a video signal from a camera circuit to a display circuit in the N mode, a video signal, from a remote terminal received through the antenna and transmission/reception circuit, to the display circuit in the R mode and the video signal from the camera circuit to the display circuit and transmission/reception circuit and a video transmission on command signal to a transmission on/off control circuit in the X mode; the display circuit applying an output video signal from the video signal control circuit to a display to reproduce an image picked up by a camera; the camera circuit converting an image incident on a camera lens into an electrical video signal, adjusting the level of the electrical video signal according to the amount of light sensed by an optical sensor in such a manner that the electrical video signal can appropriately be viewed on the display and outputting the resultant video signal to the video signal control circuit, the camera circuit storing a still image of one shot focused on the camera lens in a video memory and outputting the stored still image to the video signal control circuit, if a still image switch is turned on, and outputting a moving image focused on the camera lens to the video signal control circuit if the still image switch is turned off; an audio signal control circuit for transferring an audio signal from the microphone to the transmission/reception circuit and outputting an audio transmission on command signal to the transmission on/off control circuit, if an audio transmission switch is turned on, and transferring an audio signal from the transmission/reception circuit to the speaker if the audio transmission switch is turned off; a channel selection switch for selecting a frequency for transmission/reception of the video and audio signals; the transmission/reception circuit modulating an amplified video signal or audio signal from the video signal control circuit or audio signal control circuit into a radio frequency signal at the frequency selected by the channel selection switch, transmitting the modulated radio frequency signal to the remote terminal through the antenna, receiving a radio frequency signal from the remote terminal through the antenna at the frequency selected by the channel selection switch, demodulating the received radio frequency signal into an audio signal or video signal, amplifying the demodulated audio signal or video signal, and transferring the amplified audio signal or video signal to the audio signal control circuit or video signal control circuit; and the transmission on/off control circuit driving a video transmitter in the transmission/reception circuit in response to the video transmission on command signal from the video signal control circuit, changing the transmission/reception circuit to a video reception mode in response to the presence of no video transmission on command signal from the video signal control circuit, driving an audio transmitter in the transmission/reception circuit in response to the audio transmission on command signal from the audio signal control circuit and changing the transmission/reception circuit to an audio reception mode in response to the presence of no audio transmission on command signal from the audio signal control circuit.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

With reference to the drawings, and in particular to FIGS. 1A–5C thereof, a wireless communication system embodying the principles and concepts of the present invention will be described.

Figure 1A:
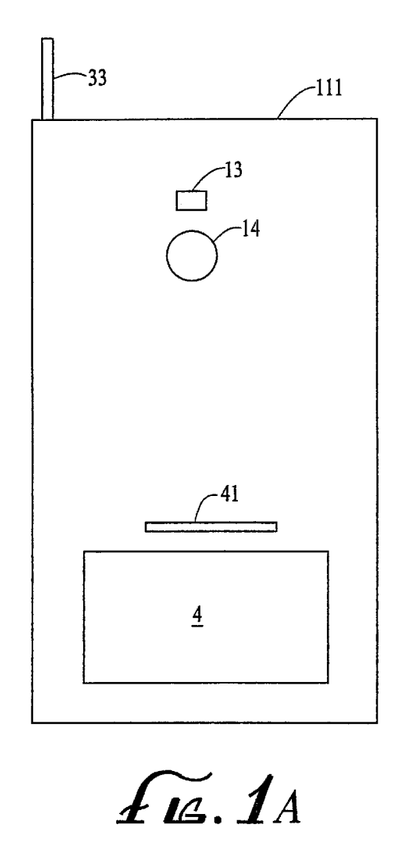
FIGS. 1A and 1B illustrate a first embodiment of a portable terminal applied to a communication system of the present invention.
Figure 1B:
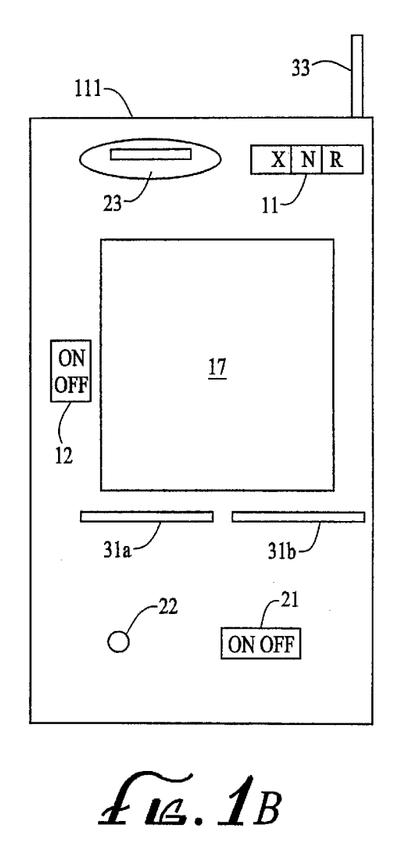

FIGS. 1A and 1B illustrate a first embodiment of a portable terminal 111 applied to a communication system of the present invention. As shown in these drawings, the portable terminal 111 preferably comprises an antenna 33 on its top, an optical sensor 13, camera lens 14, battery meter 41, and battery 4 on its one side, and a speaker 23, video mode switch 11, still image switch 12, display 17, audio channel selection switch 31a, video channel selection switch 31b, microphone 22, and audio transmission switch 21 on its other side.

Figure 2A:
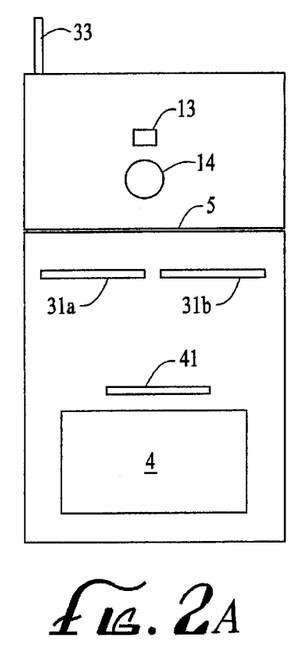
FIGS. 2A to 2C illustrate a second embodiment of the portable terminal applied to the communication system of the present invention.
Figure 2B:
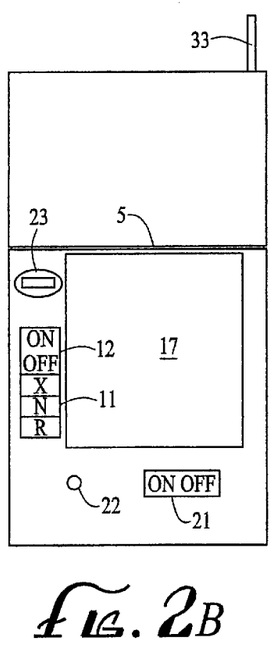
Figure 2C:
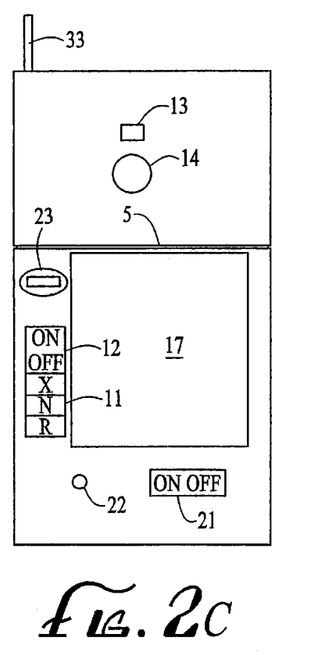

FIGS. 2A to 2C illustrate a second embodiment of the portable terminal applied to the communication system of the present invention. As shown in these drawings, the second embodiment is the same in construction as the first embodiment of FIGS. 1A and 1B, with the exception that a head containing the optical sensor 13 and the camera lens 14 is separated from the body of the portable terminal and rotatably coupled with the terminal body by a support shaft 5. The camera lens 14 may be positioned as shown in FIGS. 2A and 2B or on the same side as the microphone 22 as shown in FIG. 2C to transmit a user's image.

Figure 3:
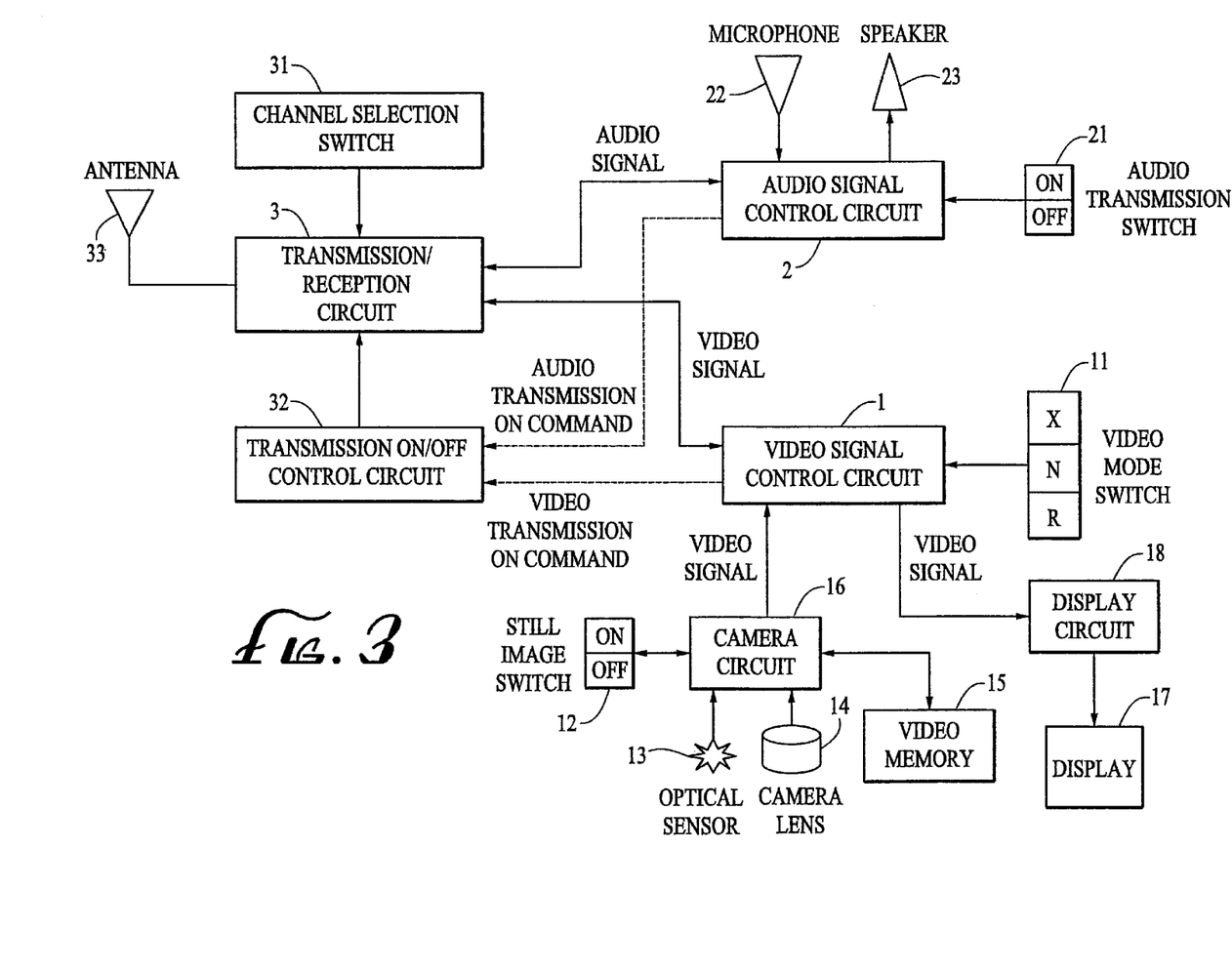
FIG. 3 illustrates a block diagram showing the entire construction of an embodiment of the communication system of the present invention.

FIG. 3 illustrates a block diagram showing the construction of an embodiment of the communication system of the present invention. Referring to FIG. 3, a video signal control circuit 1 and an audio signal control circuit 2 are connected to a transmission/reception circuit 3. The video signal control circuit 1 functions to control a transfer path of a video signal according to a mode selected by a user. Namely, if the user selects a desired one of X, N, and R modes using the video mode switch 11, the video signal control circuit 1 controls the flow of a video signal in the selected mode. Further, the video signal control circuit 1 outputs a video transmission on command signal to a transmission on/off control circuit 32 to transmit a video signal to a remote terminal.

Figure 5A:
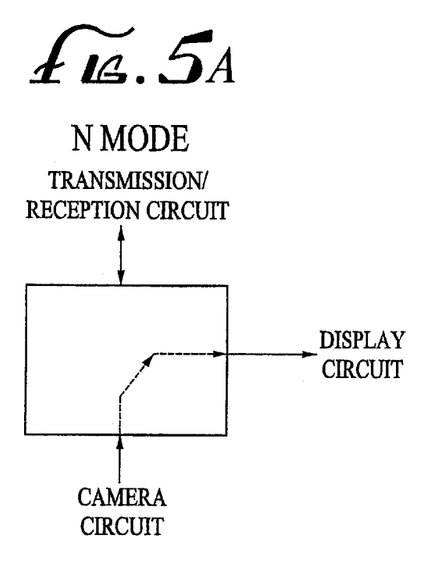
FIGS. 5A to 5C illustrate three video modes, according to the preferred embodiment of the present invention.
Figure 5B:
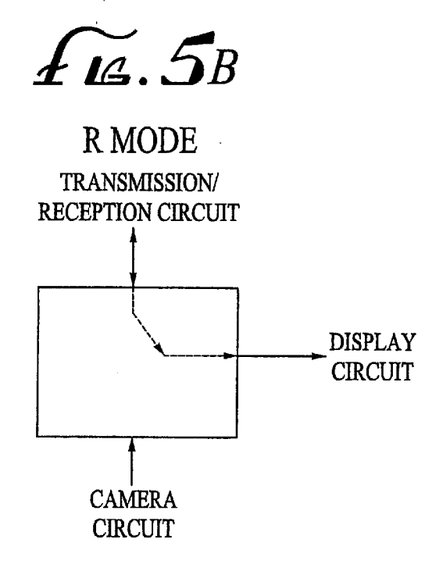
Figure 5C:
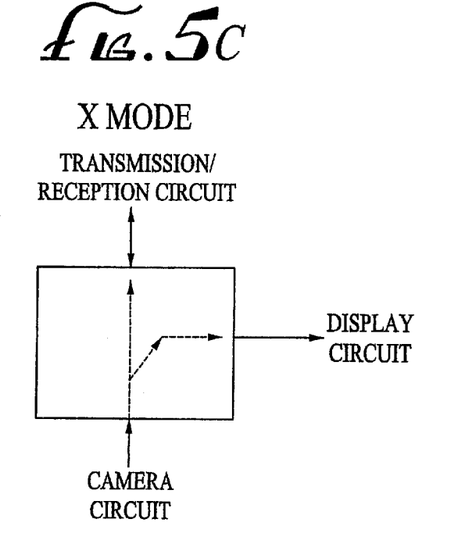

As shown in FIG. 3, the video mode switch 11 is adapted to select any one of the three modes, X, N, and R, for video communication under the control of the user. The video signal control circuit 1 recognizes a state selected by the user from the switch 11 and operates in response to the recognized state. For example, when the N mode is selected by the user, the video signal control circuit 1 transfers a video signal from a camera circuit 16 to a display circuit 18 as shown in FIG. 5A to reproduce on the display 17 an image picked up by a camera. When the R mode is selected by the user, the video signal control circuit 1 transfers a video signal from a remote terminal, received through the antenna 33 and transmission/reception circuit 3, to the display circuit 18 as shown in FIG. 5B to display an image at a remote location on the display 17. In the case where the X mode is selected by the user, the video signal control circuit 1 transfers the video signal from the camera circuit 16 to both the display circuit 18 and transmission/reception circuit 3 as shown in FIG. 5C to transmit the image picked up by the camera to the remote terminal while reproducing it on the display 17.

In the preferred embodiment, the camera is preferably comprised of an optical sensor 13, camera lens 14, and camera circuit 16. The camera circuit 16 is adapted to convert an image incident on the camera lens 14 into an electrical video signal. The optical sensor 13 is connected to the camera circuit 16 to measure the amount of light incident on the camera lens 14. Further, the camera circuit 16 adjusts the level of the electrical video signal according to the amount of light sensed by the optical sensor 13 in such a manner that the video signal can appropriately be viewed on the display 17.

When the still image switch 12 is turned on, the camera circuit 16 samples a still image of one frame focused on the camera lens 14, stores the sampled still image in a video memory 15, and outputs the stored still image to the video signal control circuit 1. In the case where the still image switch 12 is turned off, the camera circuit 16 outputs a real-time moving image focused on the camera lens 14 to the video signal control circuit 1.

The still image switch 12 is used to pick up a still image of one frame among images focused on the camera lens 14. The camera circuit 16 monitors on/off states of the still image switch 12 and supplies a still image or moving image to the video signal control circuit 1 in accordance with the monitored result.

The video memory 15 is connected to the camera circuit 16 to store a still image of one shot frame focused on the camera lens 14 when the still image switch 12 is turned on, so that it can be displayed on the display 17 by the camera circuit 16. The camera circuit 16 outputs a video signal stored in the memory 15 to the video signal control circuit 1 until the switch 12 is turned off.

The display circuit 18 is adapted to convert a video signal from the video signal control circuit 1 into a display signal for displaying on a liquid crystal display (LCD) or other display device, such as a CRT, known to one of ordinary skill in the art. The display circuit 18 then outputs the converted display signal to the display 17 to reproduce an image picked up by the camera lens 14.

The audio signal control circuit 2 functions to determine a transfer path of an audio signal with the audio transmission switch 21 being selected. Namely, the audio signal control circuit 2 transfers an electrical audio signal from the microphone 22 to the transmission/reception circuit 3, which then transmits the audio signal through the antenna 33 so that it can be reproduced by a speaker 23 of a remote terminal.

The audio transmission switch 21 is turned on/off under the control of the user to activate or inactivate an audio transmission operation. Upon sensing that the switch 21 is turned on, the audio signal control circuit 2 outputs an audio transmission on command signal to the transmission on/off control circuit 32 and, at the same time, an amplified audio signal to the transmission/reception circuit 3 to transmit it to a remote terminal. When sensing that the switch 21 is turned off, the audio signal control circuit 2 stops the output of the on command signal to operate in a mode of receiving an audio signal from the transmission/reception circuit 3.

In order to transmit an amplified video signal or audio signal to a remote location, the transmission/reception circuit 3 modulates such signal into a radio frequency (RF) signal and transmits the modulated RF signal through the antenna 33. Further, the transmission/reception circuit 3 converts an RF signal, received through the antenna 33, from a remote location into an audio signal or video signal and amplifies the converted audio signal or video signal. In other words, the transmission/reception circuit 3 frequency-modulates an input video signal or audio signal into an RF signal in a transmission mode and demodulates an input RF signal into an audio signal or video signal in a reception mode. A carrier frequency for the modulation or demodulation is regulated to that corresponding to a channel selected by a channel selection switch 31. Also, a transmitting amplifier in the transmission/reception circuit 3 outputs a video signal or audio signal in the transmission mode where the transmission of the video signal or audio signal is controlled by the transmission on/off control circuit 32. Thereafter, if the transmission control is ceased, then the transmission/reception circuit 3 is changed to the reception mode.

The channel selection switch 31 acts to set an inter-terminal transmission/reception frequency. A specific channel is assigned to each terminal group and then selected, thereby preventing an interference among a plurality of terminal groups in the same area. The transmission/reception circuit 3 selects an appropriate carrier frequency for the modulation/demodulation corresponding to the selected channel. In the process of designing the system, video and audio bandwidths are properly distributed and placed on the channel frequency within a useable frequency range.

As shown in FIG. 3, the transmission on/off control circuit 32 is adapted to supply a control signal to the transmission/reception circuit 3 to change the present invention to the video signal or audio signal transmission mode. That is, the video signal control circuit 1 outputs the video transmission on command signal to the transmission on/off control circuit 32. Also, the audio signal control circuit 2 outputs the audio transmission on command signal to the transmission on/off control circuit 32. The transmission/reception circuit amplifies a video signal and transmits the amplified video and audio signal to a remote terminal.

In response to the video or audio transmission on command signal, the transmission on/off control circuit 32 applies the control signal to the transmitting amplifier in the transmission/reception circuit 3 to operate in the transmission mode for an active duration of the control signal. Thereafter, in response to the presence of no transmission on command signal, the transmission on/off control circuit 32 applies no control signal, thereby causing the transmitting amplifier to enter a standby mode and the transmission/reception circuit 3 is in the reception mode.

Figure 4:
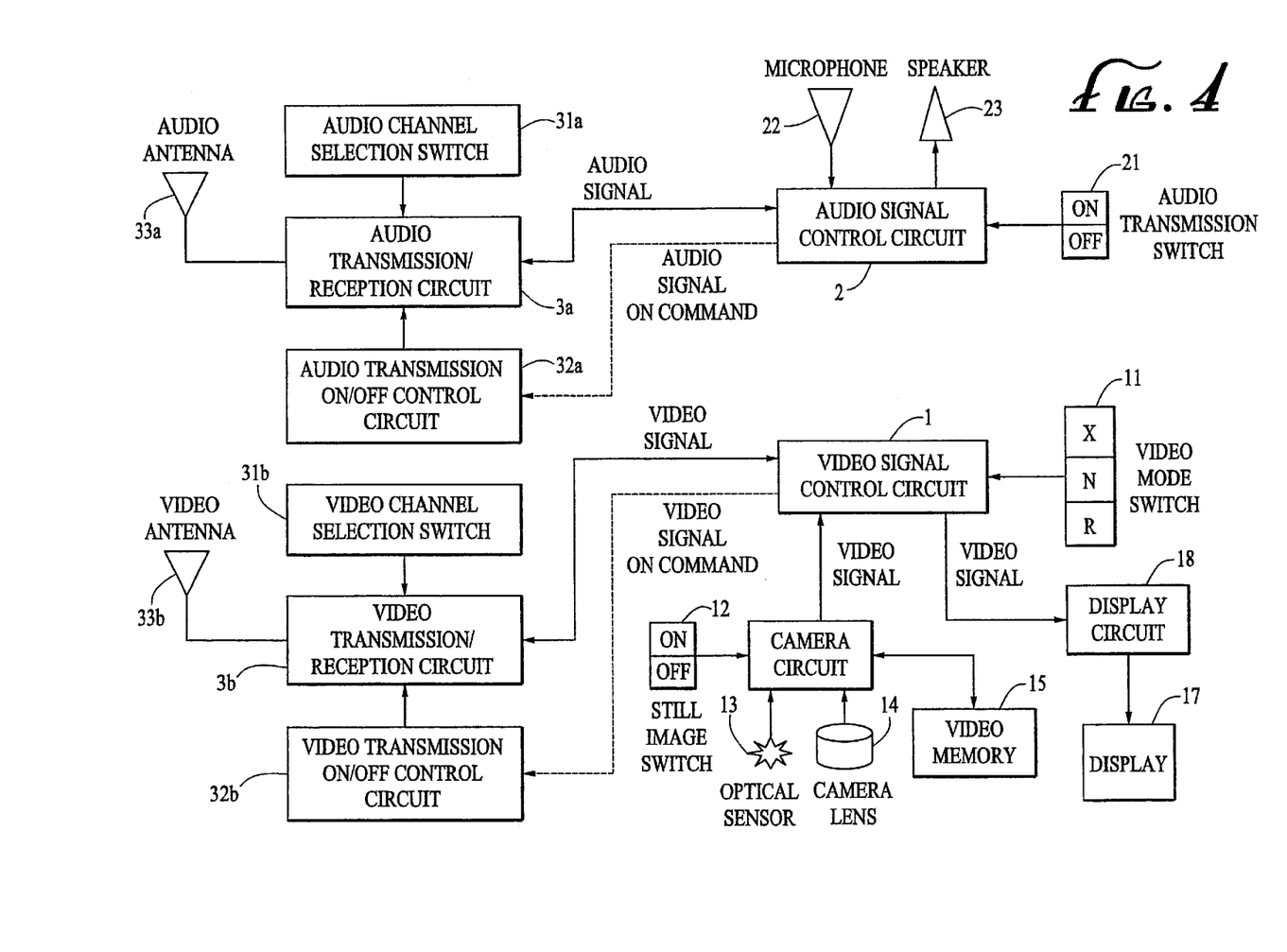
FIG. 4 is a block diagram showing the entire construction of an alternative embodiment of the communication system of the present invention.

FIG. 4 is a block diagram showing the construction of an alternative embodiment of the communication system of the present invention, wherein an audio transmission/reception circuit and a video transmission/reception circuit are separated from each other. As shown in FIG. 4, an existing full duplex audio communication system may be additionally applied to a video communication system of the present invention or the video communication system of the present invention may be additionally applied to the existing full duplex audio communication system.

Referring to FIG. 4, the video signal control circuit 1, the video mode switch 11, the still image switch 12, the video memory 15, the display circuit 18, the display 17, and the camera consisting of the optical sensor 13, camera lens 14, and camera circuit 16 are the same in construction and operation as those shown in FIG. 3.

In the upper part of FIG. 4, for the transmission of an audio signal, the audio signal control circuit 2 outputs the audio transmission on command signal to an audio transmission on/off control circuit 32a and the audio signal to an audio transmission/reception circuit 3a. As a result, a transmitter in the audio transmission/reception circuit 3a operates in an audio transmission mode in response to the audio transmission on/off control circuit 32a, and thus, transmits the audio signal from the audio signal control circuit 2 through an audio antenna 33a at a frequency selected by the audio channel selection switch 31a. Thereafter, upon the presence of no audio transmission on command signal, the audio transmission/reception circuit 3a is changed to an audio reception mode under the control of the audio transmission on/off control circuit 32a.

In the lower part of FIG. 4, for the transmission of a video signal, the video signal control circuit 1 outputs the video transmission on command signal to a video transmission on/off control circuit 32b and the video signal to a video transmission/reception circuit 3b. As a result, a transmitter in the video transmission/reception circuit 3b operates in a video transmission mode under control of the video transmission on/off control circuit 32b and thus transmits the video signal from the video signal control circuit 1 through a video antenna 33b at a frequency selected by the video channel selection switch 31b. Thereafter, upon the presence of no video transmission on command signal, the video transmission/reception circuit 3b is changed to a video reception mode under the control of the video transmission on/off control circuit 32b.

Now, a detailed description will be given of the operation of the communication system of the present invention. First, if the N mode is selected by the video mode switch 11, the system is driven to display an image picked up by the terminal camera lens 14 on the display 17 of the same terminal. In the N mode, the user can check whether the camera lens 14 accurately focuses an image of a desired object. A video signal picked up by the camera is transferred through the camera circuit 16 to the video signal control circuit 1, which then transfers the video signal to the display circuit 18. As a result, the display circuit 18 reproduces the video signal on the display 17, which may be an LCD or other display. At this time, even though the transmission/reception circuit 3 or 3b receives a signal, the display 17 outputs the video signal provided from the video signal control circuit 1.

In the case where the R mode is selected by the video mode switch 11, the system receives an image transmitted from a remote terminal. Namely, a video signal from the remote terminal is received through the antenna 33 or 33b and transmission/reception circuit 3 or 3b and then viewed on the display 17 under the control of the display circuit 18.

In the case where the X mode is selected by the video mode switch 11, the system displays an image picked up by the camera lens 14 on the display 17 and simultaneously transmits the image signal to a remote terminal. That is, an image picked up by the camera lens 14 is converted by the camera circuit 16 into a video signal, which is then transferred to the transmission/reception circuit 3 or 3b and display circuit 18 by the video signal control circuit 1. The video signal control circuit 1 further applies the video transmission on command signal to the transmission on/off control circuit 32 or 32b. As a result, the transmitting amplifier in the transmission/reception circuit 3 or 3b is driven under the control of the transmission on/off control circuit 32 or 32b to transmit the video signal through the antenna 33 or 33b.

The audio transmission switch 21 is turned on for the transmission of an audio signal to a remote terminal. If the audio transmission switch 21 is turned on, an audio signal from the microphone 22 is transmitted to the remote terminal. When the audio transmission switch 21 is turned off, an audio signal transmitted from the remote terminal is outputted through the speaker 23.

As apparent from the above description, the present invention provides a two-way wireless portable video/audio communication system wherein a portable terminal is used in a hand-held manner and includes a video input camera and a video output display, thereby implementing wireless video communication in combination with audio communication. In order to support the exchange of information through video communication among field workers, a work support team, a supervisor group, and an approval group in restricted working environments, such as a power pole, a tower crane, a special environment in a construction job-site, etc., is provided with a personal video communication system wherein a plurality of personal terminals constitute one communication group or one or more personal terminals operate at the same frequency as that of a portable video communication unit or video communication station. Further, according to the present invention, there is provided a video communication system wherein a portable terminal includes transmission on/off switches for video and audio signals so that it can be driven in a battery power saving manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A portable wireless communication system having a microphone, a speaker, a transmission/reception antenna, the communication system comprising:

a video mode switch for selecting a desired one of X, N and R modes;

a video signal control circuit for transferring a video signal from a camera circuit to a display circuit in the N mode, a video signal from a remote terminal, received through the antenna and a transmission/ reception circuit, to the display circuit in the R mode and the video signal from the camera circuit to the display circuit and transmission/reception circuit and a video transmission on command signal to a transmission on/off control circuit in the X mode;

the display circuit applying an output video signal from the video signal control circuit to a display to reproduce an image picked up by a camera;

the camera circuit converting an image incident on a camera lens into an electrical video signal, adjusting the level of the electrical video signal according to the amount of light sensed by an optical sensor in such a manner that the electrical video signal can appropriately be viewed on the display and outputting the resultant video signal to the video signal control circuit, the camera circuit storing a still image of one shot focused on the camera lens in a video memory and outputting the stored still image to the video signal control circuit, if a still image switch is turned on, and outputting a moving image focused on the camera lens to the video signal control circuit if the still image switch is turned off;

an audio signal control circuit for transferring an audio signal from the microphone to the transmission/reception circuit and outputting an audio transmission on command signal to the transmission on/off control circuit, if an audio transmission switch is turned on, and transferring an audio signal from the transmission/reception circuit to the speaker if the audio transmission switch is turned off;

a channel selection switch for selecting a frequency for transmission/reception of the video and audio signals;

the transmission/reception circuit modulating an amplified video signal or audio signal from the video signal control circuit or audio signal control circuit into a radio frequency signal at the frequency selected by the channel selection switch, transmitting the modulated radio frequency signal to the remote terminal through the antenna, receiving a radio frequency signal from the remote terminal through the antenna at the frequency selected by the channel selection switch, demodulating the received radio frequency signal into an audio signal or video signal, amplifying the demodulated audio signal or video signal and transferring the amplified audio signal or video signal to the audio signal control circuit or video signal control circuit; and the transmission on/off control circuit driving a video transmitter in the transmission/reception circuit in response to the video transmission on command signal from the video signal control circuit, changing the transmission/reception circuit to a video reception mode in response to the presence of no video transmission on command signal from the video signal control circuit, driving an audio transmitter in the transmission/reception circuit in response to the audio transmission on command signal from the audio signal control circuit and changing the transmission/reception circuit to an audio reception mode in response to the presence of no audio transmission on command signal from the audio signal control circuit.

2. The portable wireless communication system of claim 1, wherein the housing has first and second portions, wherein the local camera is in the first portion which is rotatably connected to the second portion.

3. A portable wireless communication system having a microphone, a speaker, a transmission/reception antenna, the communication system comprising:

a video mode switch for selecting a desired one of X, N and R modes;

a video signal control circuit for transferring a video signal from a camera circuit to a display circuit in the N mode, a video signal from a remote terminal, received through the antenna and a video transmission/reception circuit, to the display circuit in the R mode and the video signal from the camera circuit to the display circuit and video transmission/reception circuit and a video transmission on command signal to a video transmission on/off control circuit in the X mode;

the display circuit applying an output video signal from the video signal control circuit to a display to reproduce an image picked up by a camera;

the camera circuit converting an image incident on a camera lens into an electrical video signal, adjusting the level of the electrical video signal according to the amount of light sensed by an optical sensor in such a manner that the electrical video signal can appropriately be viewed on the display and outputting the resultant video signal to the video signal control circuit, the camera circuit storing a still image of one shot focused on the camera lens in a video memory and outputting the stored still image to the video signal control circuit, if a still image switch is turned on, and outputting a moving image focused on the camera lens to the video signal control circuit if the still image switch is turned off; and the video transmission/reception circuit modulating an amplified video signal from the video signal control circuit into a radio frequency signal at a selected channel frequency, transmitting the modulated radio frequency signal to the remote terminal through the antenna, receiving a radio frequency signal from the remote terminal through the antenna at the selected channel frequency, demodulating the received radio frequency signal into a video signal, amplifying the demodulated video signal and transferring the amplified video signal to the video signal control circuit.

4. The portable wireless communication system of claim 3, wherein the optical sensor and camera lens are installed in a head, the head being rotatably coupled with a terminal body by a support shaft.

5. A portable wireless communication system having a microphone, a speaker, a transmission/reception antenna, the communication system comprising:

a main communication system comprising:
a local camera disposed in a housing for the communication system;
a video mode switch for selecting one of first, second, third modes;
a camera circuit for converting an image incident on the local camera into a video signal;
a display circuit for displaying images;
a video signal control circuit for transferring the video signal from the camera circuit to the display circuit in the first mode, transferring the video signal from a remote terminal, received through the antenna to the display circuit in the second mode and transferring the video signal from the camera circuit to the display circuit and transmitting through the antenna in the third mode;
a channel selection switch for selecting a frequency for transmission/reception of the video signal;
a transmission/reception circuit for modulating an amplified video signal from the video signal control circuit into a radio frequency signal at the frequency selected by the channel selection switch, transmitting the modulated radio frequency signal to the remote terminal through the antenna; and a transmission on/off control circuit for controlling the transmission/reception circuit in response to the video signal control circuit.

6. The portable wireless communication system of claim 5, wherein the remote terminal comprises a remote camera disposed in a housing;

a camera circuit for converting an image incident on the remote camera into a video signal;

a video signal control circuit for transferring the video signal from the camera circuit to the display circuit and transmitting through the antenna;

a transmission circuit for modulating an amplified video signal into a radio frequency signal and transmitting the modulated radio frequency signal to the main communication system through the antenna;

a channel selection switch connected to the transmission circuit for selecting a frequency for transmission of the video signal; and a transmission on/off control circuit for controlling the transmission/reception circuit in response to the video signal control circuit.

7. The portable wireless communication system of claim 5, further comprising an audio signal control circuit for transferring an audio signal from the microphone to the transmission/reception circuit and for outputting an audio transmission on command signal to the transmission on/off control circuit when an audio transmission switch is enabled, and transferring an audio signal from the transmission/reception circuit to the speaker when the audio transmission switch is disabled.

8. The portable wireless communication system of claim 7, wherein the transmission on/off circuit changes the transmission/reception circuit to a video reception mode in response to the presence of a no-video transmission on command signal from the video signal control circuit, drives an audio transmitter in the transmission/reception circuit in response to the audio transmission on command signal from the audio signal control circuit and changes the transmission/reception circuit to an audio reception mode in response to the presence of no-audio transmission on command signal from the audio signal control circuit.

9. The portable wireless communication system of claim 7, wherein the transmission/reception circuit receives a radio frequency signal from the remote terminal through the antenna at the frequency selected by the channel selection switch, demodulating the received radio frequency signal into an audio signal, amplifying the demodulated audio signal and transferring the amplified audio signal to the audio signal control circuit.

10. The portable wireless communication system of claim 7, wherein the transmission/reception circuit modulates an audio signal from the audio signal control circuit into a radio frequency signal at the frequency selected by the channel selection switch, transmitting the modulated radio frequency signal to the remote terminal through the antenna.

11. The portable wireless communication system of claim 5, wherein the transmission/reception circuit receives a radio frequency signal from the remote terminal through the antenna at the frequency selected by the channel selection switch, demodulates the received radio frequency signal into the video signal, amplifies the demodulated video signal and transfers the amplified video signal to the video signal control circuit.

12. The portable wireless communication system of claim 11, further comprising an audio signal control circuit for transferring an audio signal from the microphone to the transmission/reception circuit and for outputting an audio transmission on command signal to the transmission on/off control circuit when an audio transmission switch is enabled, and transferring an audio signal from the transmission/reception circuit to the speaker when the audio transmission switch is disabled.

13. The portable wireless communication system of claim 12, wherein the transmission on/off circuit changes the transmission/reception circuit to a video reception mode in response to the presence of a no-video transmission on command signal from the video signal control circuit, drives an audio transmitter in the transmission/reception circuit in response to the audio transmission on command signal from the audio signal control circuit and changes the transmission/reception circuit to an audio reception mode in response to the presence of no-audio transmission on command signal from the audio signal control circuit.

14. The portable wireless communication system of claim 12, wherein the transmission/reception circuit receives a radio frequency signal from the remote terminal through the antenna at the frequency selected by the channel selection switch, demodulating the received radio frequency signal into an audio signal, amplifying the demodulated audio signal and transferring the amplified audio signal to the audio signal control circuit.

15. The portable wireless communication system of claim 12, wherein the transmission/reception circuit modulates an audio signal from the audio signal control circuit into a radio frequency signal at the frequency selected by the channel selection switch, transmitting the modulated radio frequency signal to the remote terminal through the antenna.

16. The portable wireless communication system of claim 5, wherein the camera circuit stores a still frame image in a video memory and outputs the stored still frame image to the video signal control circuit when a still image switch is enabled, and outputs a moving image detected by the camera to the video signal control circuit when the still image switch is disabled.

17. The portable wireless communication system of claim 5, wherein the camera circuit adjusts the level of the electrical video signal according to the amount of light sensed by an optical sensor in such a manner that the electrical video signal can appropriately be viewed on the display and outputting the resultant video signal to the video signal control circuit.

18. The portable wireless communication system of claim 5, wherein the housing has first and second portions, wherein the local camera is in the first portion which is rotatably connected to the second portion.

19. The portable wireless communication system of claim 5, wherein the channel selection switch selects a frequency for transmission/reception of audio signal.

* * * * *